United States Patent
Lee et al.

(10) Patent No.: US 8,866,995 B2
(45) Date of Patent: Oct. 21, 2014

(54) LIQUID CRYSTAL DISPLAY DEVICE

(75) Inventors: Jong Beom Lee, Paju-si (KR); Jong Won Moon, Paju-si (KR); Hye Rin Hyun, Paju-si (KR)

(73) Assignee: LG Display Co., Ltd., Seoul (KR)

(*) Notice: Subject to any disclaimer, the term of this patent is extended or adjusted under 35 U.S.C. 154(b) by 247 days.

(21) Appl. No.: 12/776,865

(22) Filed: May 10, 2010

(65) Prior Publication Data
US 2011/0149205 A1    Jun. 23, 2011

(30) Foreign Application Priority Data
Dec. 23, 2009 (KR) .................. 10-2009-0129760

(51) Int. Cl.
*G02F 1/1335* (2006.01)
(52) U.S. Cl.
CPC .............. *G02F 1/133514* (2013.01); *G02F 2001/133562* (2013.01)
USPC ............................ 349/67; 349/97; 349/117
(58) Field of Classification Search
USPC ............ 349/96–98, 115, 117–121, 58–67
See application file for complete search history.

(56) References Cited

U.S. PATENT DOCUMENTS

| | | | |
|---|---|---|---|
| 6,011,602 A * | 1/2000 | Miyashita et al. | 349/65 |
| 6,504,588 B1 * | 1/2003 | Kaneko | 349/71 |
| 7,292,292 B2 * | 11/2007 | Schadt et al. | 349/98 |
| 2003/0016317 A1 * | 1/2003 | Kotchick et al. | 349/96 |
| 2005/0162583 A1 * | 7/2005 | Ozolins et al. | 349/58 |
| 2007/0236636 A1 * | 10/2007 | Watson et al. | 349/117 |
| 2008/0316397 A1 * | 12/2008 | Polak et al. | 349/97 |
| 2010/0177266 A1 * | 7/2010 | Kuo et al. | 349/78 |
| 2010/0328864 A1 * | 12/2010 | Yoshihara et al. | 361/679.01 |

FOREIGN PATENT DOCUMENTS

CN    1266504 A    9/2000

* cited by examiner

*Primary Examiner* — Bumsuk Won
*Assistant Examiner* — Charles Chang
(74) *Attorney, Agent, or Firm* — McKenna Long & Aldridge LLP (57) ABSTRACT

A liquid crystal display (LCD) device is disclosed, which comprises a liquid crystal panel which can be displayed in any other color instead of a black color during a non-driving mode through the use of one-color film for selectively reflecting light with a predetermined wavelength. The LCD device comprises a backlight unit for supplying light to a liquid crystal panel including lower and upper substrates; a first polarizing plate formed between the lower substrate and the backlight unit; a second polarizing plate formed on the upper substrate; a passivation substrate for protecting the lower and upper substrates; and a one-color film for selectively reflecting light with a predetermined wavelength during a non-driving mode of the backlight unit.

7 Claims, 5 Drawing Sheets

LIQUID CRYSTAL DISPLAY DEVICE

CROSS REFERENCE TO RELATED APPLICATIONS

This application claims the benefit of the Korean Patent Application No. P2009-0129760 filed on Dec. 23, 2009, which is hereby incorporated by reference as if fully set forth herein.

BACKGROUND OF THE INVENTION

1. Field of the Invention

The present invention relates to a liquid crystal display (LCD) device, and more particularly, to an LCD device with a liquid crystal panel which can be displayed in any other color instead of a black color during a non-driving mode through the use of one-color film for selectively reflecting light with a predetermined wavelength. Although the present invention is suitable for a wide scope of applications, it is particularly suitable for displaying the liquid crystal panel with the same color as that of an external case during the non-driving mode of the liquid crystal panel.

2. Discussion of the Related Art

Generally, an active matrix type LCD device displays images by controlling light transmittance of liquid crystal through a thin film transistor (hereinafter, referred to as "TFT") serving as a switching element. The LCD device has been widely used in various fields of portable information devices, office devices, computer and IT products, and etc., owing to the advantageous properties of low power consumption, thin profile, and lightness in weight.

The LCD device cannot emit light in itself. Thus, it is necessary to additionally provide light to the LCD device. The LCD device can display images through the use of light emitted from a backlight unit positioned under a liquid crystal panel or ambient light provided from the external. When maximizing transmittance of light through a liquid crystal layer of the liquid crystal panel, a white-colored image with high luminance can be displayed on the liquid crystal panel. Meanwhile, when minimizing transmittance of light through the liquid crystal layer of the liquid crystal panel, a black-colored image with low luminance can be displayed on the liquid crystal panel.

Hereinafter, an LCD device according to the related art will be described in detail with reference to the accompanying drawings.

Figure 1:
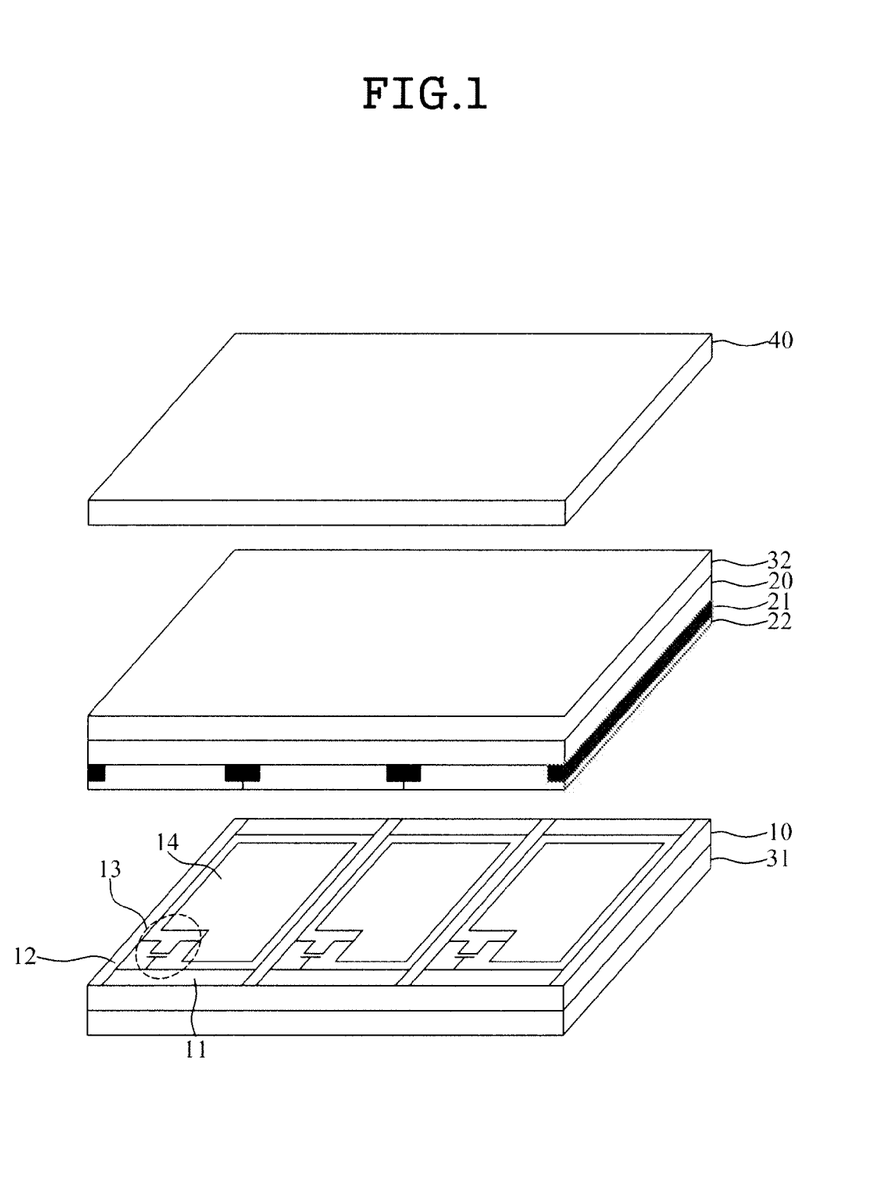
FIG. 1 is a perspective view illustrating an LCD device according to the related art.

FIG. 1 is a perspective view illustrating the LCD device according to the related art.

Referring to FIG. 1, the LCD device according to the related art includes a liquid crystal panel provided with a lower substrate 10, an upper substrate 20, and a liquid crystal layer (not shown) formed between the lower and upper substrates 10 and 20; a backlight unit (not shown) for supplying light to the liquid crystal panel; and a driving circuit (not shown) for driving the liquid crystal panel.

On the lower substrate 10 of the liquid crystal panel, there are gate and data lines 11 and 12, and a thin film transistor 13. The gate and data lines 11 and 12 cross at right angles to each other, that is, are perpendicular to each other, to thereby define a pixel region. The thin film transistor 13 is formed at a crossing of the gate and data lines 11 and 12, wherein the thin film transistor 13 functions as a switching element.

In the pixel region, there is a pixel electrode 14 of a transparent conductive material such as ITO (Indium Tin Oxide), wherein the pixel electrode 14 is formed in parallel to the data line 12, and is electrically connected with the thin film transistor 13.

On the upper substrate 20 of the liquid crystal panel, there are a light-shielding layer 21 and a color filter layer 22. The light-shielding layer 21 prevents the light from leaking in the gate line 11, the data line 12, and the thin film transistor 13. The color filter layer 22 is interposed between each light-shielding layer 21, wherein the color filter layer 22 selectively transmits only light with a predetermined wavelength. In this case, the color filter layer 22 comprises red (R), green (G), and blue (B) color filters.

Also, a lower polarizing film 31 is formed on a rear surface of the lower substrate 10, and an upper polarizing film 32 is formed on the upper substrate 20. A passivation substrate 40 is formed on the upper polarizing film 32 so as to protect the lower and upper substrates 10 and 20.

When the thin film transistor 13 is turned-on by a diving signal applied to the gate line 11, an analog data signal applied to the data line 12 is applied to the pixel electrode 14 through a channel layer of the thin film transistor 13. Through the aforementioned process, it is possible to control the light transmittance of liquid crystal. Then, the light transmitted through the liquid crystal layer passes through the color filter layer 22, thereby displaying full-color images.

Figure 2:
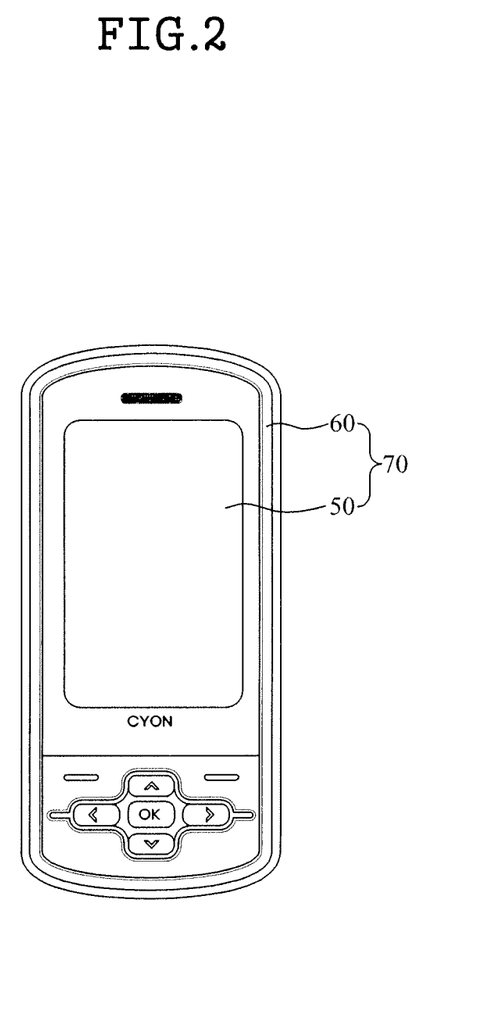
FIG. 2 is a plane view illustrating a mobile LCD terminal with an LCD device according to the related art.

FIG. 2 is a plane view illustrating a mobile LCD terminal 70 (hereinafter, referred to as "terminal") with the LCD device according to the related art.

As shown in FIG. 2, the terminal 70 includes the aforementioned liquid crystal panel 50; a backlight unit (not shown) for supplying the light to the liquid crystal panel 50; a driving circuit (not shown) for driving the liquid crystal panel 50; and an external case 60 for covering the liquid crystal panel 50.

As mentioned above, when the terminal 70 according to the related art is in a non-driving mode, that is, power is not applied to the terminal 70, the light emitted from the backlight unit is not supplied to the liquid crystal panel 50. Instead, the ambient light provided from the external is absorbed by the lower and upper polarizing films 31 and 32, whereby the liquid crystal panel 50 is displayed as a black-colored screen.

Recently, the terminal 70 is regarded as an accessory beyond simple communication means. That is, color and design of the external case 60 in the terminal 70 may be selected among the most important factors in determining the consumer's preference for the product. In this respect, there is a growing tendency for the external case 60 to use the various colors as well as black or white.

However, the terminal 70 according to the related art is formed in such a way that the liquid crystal panel is displayed only with the black color during the non-driving mode. During the non-driving mode, the external case 60 is different from the liquid crystal panel in color, which might cause a decline in consumer's preference.

SUMMARY OF THE INVENTION

Accordingly, the present invention is directed to an LCD device that substantially obviates one or more problems due to limitations and disadvantages of the related art.

An aspect the present invention is to provide an LCD device with a liquid crystal panel which is capable of being displayed in any other color instead of a black color during a non-driving mode, that is, when power is not supplied thereto.

Another aspect of the present invention is to provide an LCD device with a liquid crystal panel which is capable of being displayed in the same color as that of an external case during a non-driving mode, that is, when power is not supplied thereto.

Another aspect of the present invention is to provide an LCD device with a liquid crystal panel which is capable of being displayed in any other color instead of a black color during a non-driving mode of the liquid crystal panel through the use of one-color film for selectively reflecting light with a predetermined wavelength.

Additional features and aspects of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device comprising a backlight unit for supplying light to a liquid crystal panel including lower and upper substrates; a first polarizing plate formed between the lower substrate and the backlight unit; a second polarizing plate formed on the upper substrate; a passivation substrate for protecting the lower and upper substrates; and a one-color film for selectively reflecting light with a predetermined wavelength during a non-driving mode of the backlight unit.

At this time, the one-color film selectively reflects light with the same color as that of the external case.

The one-color film comprises a cholesteric liquid crystal layer and a quarter wave plate.

The one-color film may be formed on the passivation substrate, or under the passivation substrate.

Also, the one-color film may be formed on the second polarizing plate, or under the second polarizing plate.

The one-color film comprises a cholesteric liquid crystal layer and a quarter wave plate, wherein the cholesteric liquid crystal layer is formed on the passivation substrate, or under the passivation substrate.

At this time, the quarter wave plate may be formed on the second polarizing plate, or under the second polarizing plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings. The LCD device according to the present invention is characterized in that a liquid crystal panel is displayed in the same color as that of an external case during a non-driving mode of the liquid crystal panel through the use of one-color film for selectively reflecting light with a predetermined wavelength.

Figure 3:
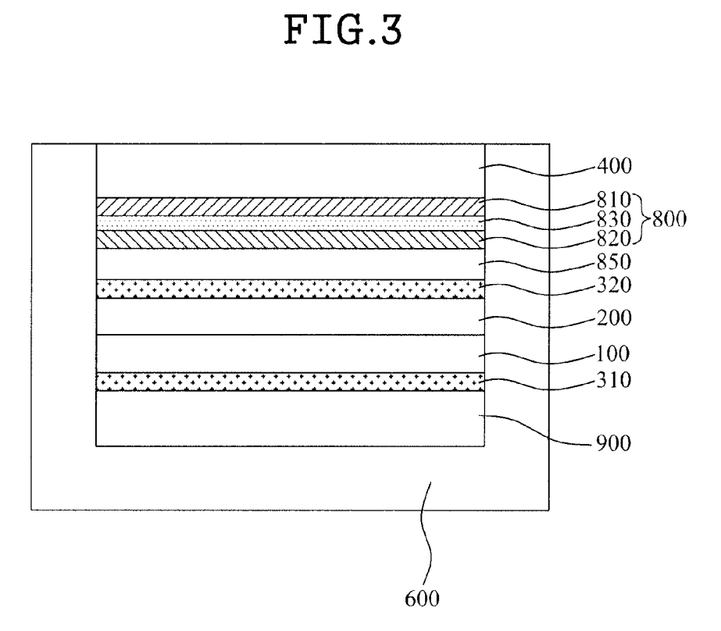
FIG. 3 is a cross section view illustrating an LCD device according to the first embodiment of the present invention.

FIG. 3 is a cross section view illustrating an LCD device according to the first embodiment of the present invention.

As shown in FIG. 3, the LCD device according to the first embodiment of the present invention includes a lower substrate 100, an upper substrate 200, a backlight unit 900, and a one-color film 800 for selectively reflecting light with a predetermined wavelength.

Although not shown in FIG. 3, the lower substrate 100 includes a gate line, a data line, a thin film transistor, and a pixel electrode; and the upper substrate 200 includes a light-shielding layer and a color filter layer.

Also, a first polarizing plate (lower polarizing plate) 310 is formed between the lower substrate 100 and the backlight unit 900; and a second polarizing plate (upper polarizing plate) 320 is formed on the upper substrate 200.

There is a passivation substrate 400 above the second polarizing plate 320, wherein the passivation substrate 400 is positioned at a predetermined interval from the second polarizing plate 320. At this time, the passivation substrate 400 may be formed of a transparent material such as glass. If a touch panel is applied to the LCD device according to the present invention, the touch panel may function as the passivation substrate 400.

Between the passivation substrate 400 and the second polarizing plate 320, there is the one-color film 800 for selectively reflecting the light with the predetermined wavelength during the non-driving mode of the liquid crystal panel. In this case, an air gap 850 may be formed between the one-color film 800 and the second polarizing plate 320.

The pixel electrode may be formed of a transparent conductive material such as ITO (Indium Tin Oxide). The pixel electrode is formed in parallel to the data line, and is electrically connected with the thin film transistor.

According as a scan signal is received in the gate line on the lower substrate 100 from a gate driving circuit (not shown), the gate line supplies the received scan signal to the thin film transistor. According as an analog data signal is received in the data line on the lower substrate 100 from a data driving circuit (not shown), the data line supplies the received analog data signal to the thin film transistor.

In response to the scan signal from the gate line, the thin film transistor supplies the analog data signal from the data line to the pixel electrode. Thereafter, in response to the analog data signal from the thin film transistor, the pixel electrode applies an electric field to a liquid crystal layer. According to input video data, it is possible to control a transmittance of light emitted from the backlight unit and transmitted through the liquid crystal layer, to thereby display images on the liquid crystal panel.

In order to obtain the single color in the LCD device with the external case 600 during the non-driving mode, the light with the predetermined wavelength has to be selectively reflected during the non-driving mode. At this time, the light with the predetermined wavelength should be identical in color with the external case 600. For this, the LCD device according to the present invention is formed in such a way that the one-color film 800 is identical in color with the external case 600.

The one-color film 800 comprises a cholesteric liquid crystal layer (hereinafter, referred to as "CLC layer") 810, and a quarter wave plate (hereinafter, referred to as "QWP") 820. Also, an adhesive layer 830 is formed between the CLC layer 810 and the QWP 820. The adhesive layer 830 may be formed of a pressure sensitive adhesive (hereinafter, referred to as "PSA").

During the non-driving mode of the liquid crystal panel in the LCD device according to the related art, ambient light is absorbed by the lower and upper polarizing plates, whereby the liquid crystal panel is displayed in the black color, thereby displaying the black-colored screen on the liquid crystal panel.

Meanwhile, in case of the LCD device according to the present invention, the aforementioned one-color film 800 can reflect the light with the predetermined wavelength among the ambient light provided from the external during the non-driving mode of the liquid crystal panel. Accordingly, the light with the predetermined wavelength is reflected on the one-color filter 800, so that it is possible to display a predetermined-colored screen on the liquid crystal panel.

At this time, the predetermined wavelength of the light reflected on the one-color film 800 is determined based on the characteristics of the CLC layer 810 included in the one-color film 800. That is, the wavelength of the light to be reflected on the one-color film 800 is changed according to the characteristics of the CLC layer 810. During the non-driving mode of the liquid crystal panel, the color displayed on the liquid crystal panel corresponds to the color of the light with the predetermined wavelength reflected on the one-color film 800.

During a driving mode of the liquid crystal panel, the CLC layer 810 is in a homeotropic alignment, whereby the one-color film 800 becomes transparent. Thus, the ambient light is not reflected on the one-color film 800.

Since the one-color film 800 becomes transparent during the driving mode of the liquid crystal panel, the light emitted from the backlight unit 900 can pass through the transparent one-color film 800, whereby it makes no influence picture quality of the image displayed on the liquid crystal panel.

The one-color film 800 may be formed in such a way that the CLC layer 810 is positioned adjacent to the QWP 820. In the meantime, another embodiment of the present invention may disclose that the CLC layer 810 is positioned at a predetermined interval from the QWP 820; or may disclose that the one-color film 800 comprises an additional element interposed between the CLC layer 810 and the QWP 820.

In the LCD device according to the first embodiment of the present invention, the predetermined color is displayed on the liquid crystal panel by reflecting only the light with the predetermined wavelength from the ambient light during the non-driving mode of the liquid crystal panel. However, during the driving mode of the liquid crystal panel, the one-color film 800 becomes transparent, whereby the light emitted from the backlight unit 900 passes through the transparent one-color film 800, thereby displaying the image based on the video data on the liquid crystal panel.

Figure 4:
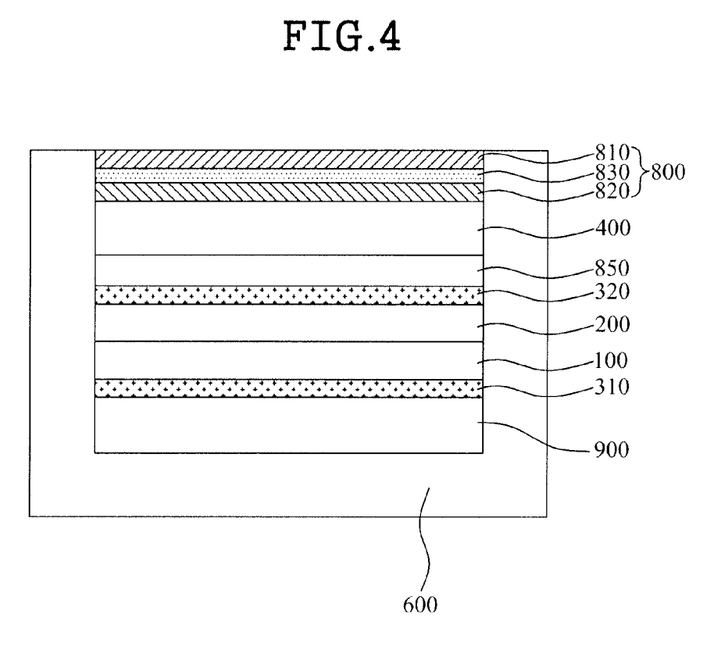
FIG. 4 is a cross section view illustrating an LCD device according to the second embodiment of the present invention.

FIG. 4 is a cross section view illustrating an LCD device according to the second embodiment of the present invention.

As shown in FIG. 4, the LCD device according to the second embodiment of the present invention includes lower and upper substrates 100 and 200 confronting each other, a backlight unit 900, and a one-color film 800 for selectively reflecting light with a predetermined wavelength.

Also, a first polarizing plate 310 is formed between the lower substrate 100 and the backlight unit 900; and a second polarizing plate 320 is formed on the upper substrate 200.

There is a passivation substrate 400 above the second polarizing plate 320, wherein the passivation substrate 400 is positioned at a predetermined interval from the second polarizing plate 320. At this time, the passivation substrate 400 may be formed of a transparent material such as glass. If a touch panel is applied to the LCD device according to the present invention, the touch panel may function as the passivation substrate 400.

Except a position of the one-color film 800, the LCD device according to the second embodiment of the present invention is identical in structure with the LCD device according to the first embodiment of the present invention. Thus, a detailed explanation for the structure of the LCD device according to the second embodiment of the present invention will be omitted.

The LCD device according to the second embodiment of the present invention includes the one-color film 800 formed on the passivation substrate 400.

In the aforementioned LCD device according to the second embodiment of the present invention, the one-color film 800 formed on the passivation substrate 400 reflects only light with a predetermined wavelength among the ambient light provided from the external during the non-driving mode of the liquid crystal panel so that a predetermined-colored screen is displayed on the liquid crystal panel, wherein the predetermined wavelength of the light to be reflected is determined based on the characteristics of the one-color film 800.

Figure 5:
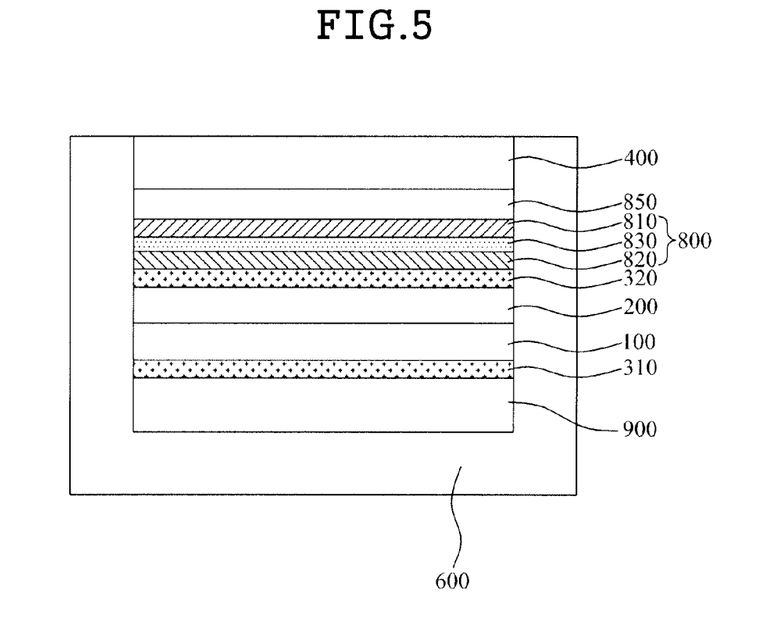
FIG. 5 is a cross section view illustrating an LCD device according to the third embodiment of the present invention.

FIG. 5 is a cross section view illustrating an LCD device according to the third embodiment of the present invention.

As shown in FIG. 5, the LCD device according to the third embodiment of the present invention includes lower and upper substrates 100 and 200 confronting each other, a backlight unit 900, and a one-color film 800 for selectively reflecting light with a predetermined wavelength.

Also, a first polarizing plate 310 is formed between the lower substrate 100 and the backlight unit 900; and a second polarizing plate 320 is formed on the upper substrate 200. There is a passivation substrate 400 above the second polarizing plate 320, wherein the passivation substrate 400 is positioned at a predetermined interval from the second polarizing plate 320.

Except a position of the one-color film 800, the LCD device according to the third embodiment of the present invention is identical in structure with the LCD device according to the first embodiment of the present invention.

In the LCD device according to the third embodiment of the present invention, the one-color film 800 is formed on the second polarizing plate 320. At this time, an air gap 850 may be formed between the one-color film 800 and the second polarizing plate 320.

In the aforementioned LCD device according to the third embodiment of the present invention, the one-color film 800 formed on the second polarizing plate 320 reflects only light with a predetermined wavelength among the ambient light provided from the external during the non-driving mode of the liquid crystal panel so that a predetermined-colored screen is displayed on the liquid crystal panel, wherein the predetermined wavelength of the light to be reflected is determined based on the characteristics of the one-color film 800.

Figure 6:
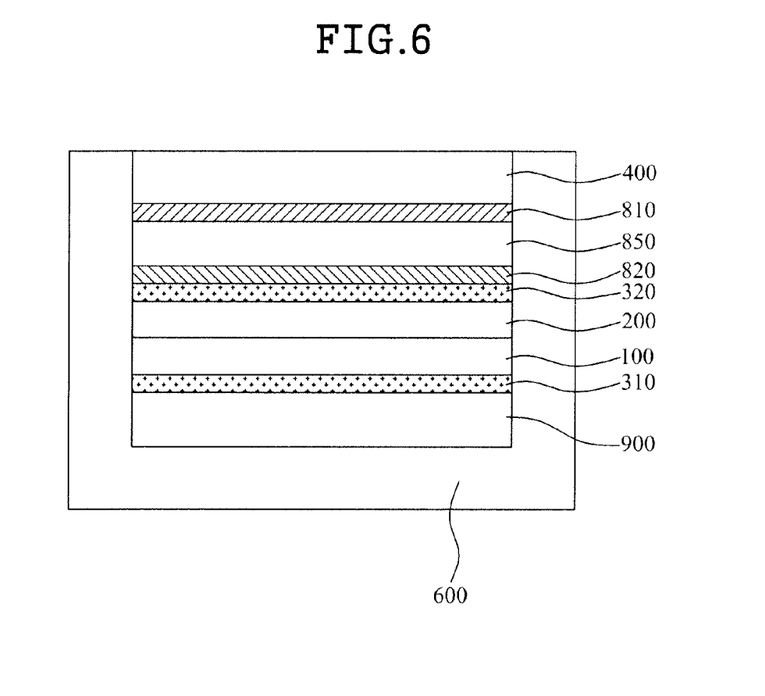
FIG. 6 is a cross section view illustrating an LCD device according to the fourth embodiment of the present invention.

FIG. 6 is a cross section view illustrating an LCD device according to the fourth embodiment of the present invention.

As shown in FIG. 6, the LCD device according to the fourth embodiment of the present invention includes lower and upper substrates 100 and 200 confronting each other, a backlight unit 900, and a one-color film 800 for selectively reflecting light with a predetermined wavelength.

Also, a first polarizing plate 310 is formed between the lower substrate 100 and the backlight unit 900; and a second polarizing plate 320 is formed on the upper substrate 200. There is a passivation substrate 400 above the second polarizing plate 320, wherein the passivation substrate 400 is positioned at a predetermined interval from the second polarizing plate 320.

Except a position of the one-color film 800, the LCD device according to the fourth embodiment of the present invention is identical in structure with the LCD device according to the first embodiment of the present invention.

The LCD device according to the fourth embodiment of the present invention includes the one-color film 800 comprising a CLC layer 810 and a QWP 820, wherein the CLC layer 810 is formed on a rear surface of the passivation substrate 400, and the QWP 820 is formed on the second polarizing plate 320.

In the one-color film 800, the CLC layer 810 may be formed at a predetermined interval from the QWP 820, wherein an air gap 850 may be formed between the CLC layer 810 and the QWP 820. Thus, an adhesive layer 830 shown in FIG. 3 is not included in the one-color film 800 of the LCD device according to the fourth embodiment of the present invention shown in FIG. 6.

In the aforementioned LCD device according to the fourth embodiment of the present invention, the one-color film 800 formed on the second polarizing plate 320 reflects only light with a predetermined wavelength among the ambient light provided from the external during the non-driving mode of the liquid crystal panel so that a predetermined-colored screen is displayed on the liquid crystal panel, wherein the predetermined wavelength of the light to be reflected is determined based on the characteristics of the one-color film 800.

Figure 7:
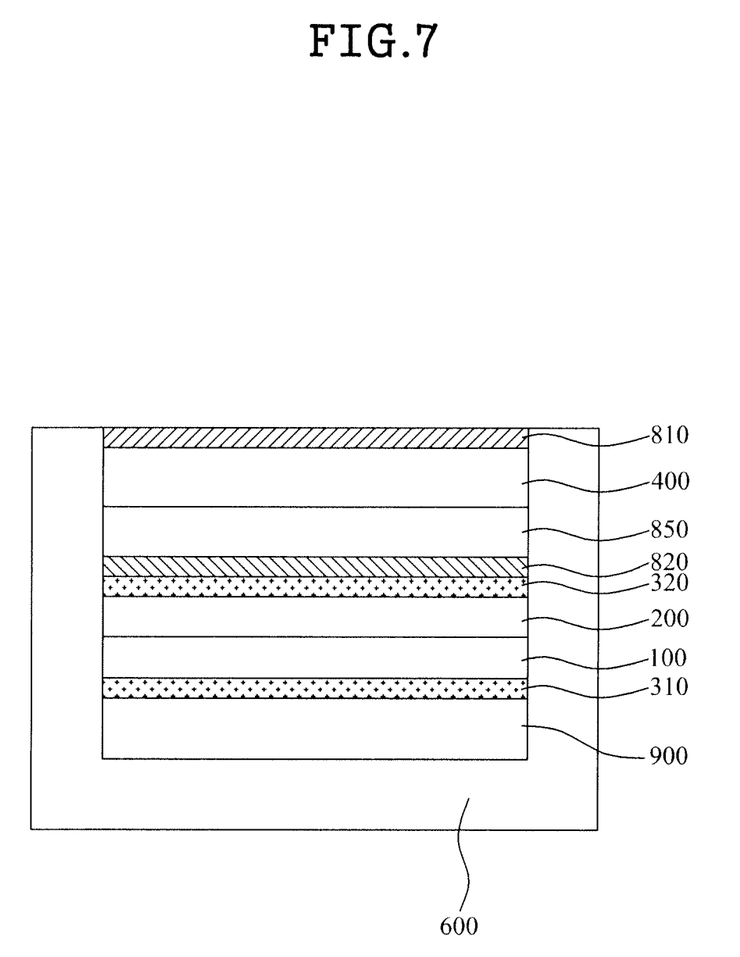
FIG. 7 is a cross section view illustrating an LCD device according to the fifth embodiment of the present invention.

FIG. 7 is a cross section view illustrating an LCD device according to the fifth embodiment of the present invention.

As shown in FIG. 7, the LCD device according to the fifth embodiment of the present invention includes lower and upper substrates 100 and 200 confronting each other, a backlight unit 900, and a one-color film 800 for selectively reflecting light with a predetermined wavelength.

Also, a first polarizing plate 310 is formed between the lower substrate 100 and the backlight unit 900; and a second polarizing plate 320 is formed on the upper substrate 200.

Except a position of a CLC layer 810 included in the one-color film 800, the LCD device according to the fifth embodiment of the present invention is identical in structure with the LCD device according to the fourth embodiment of the present invention.

The LCD device according to the fifth embodiment of the present invention includes the one-color film 800 comprising the CLC layer 810 and a QWP 820, wherein the CLC layer 810 is formed on a passivation substrate 400, and the QWP 820 is formed on the second polarizing plate 320.

As shown in FIG. 7, even though the one-color film 800 is formed in such a structure that the CLC layer 810 is positioned at a predetermined interval from the QWP 820, it is possible to reflect only light with a predetermined wavelength among the ambient light provided from the external through the use of one-color film 800 during the non-driving mode of the liquid crystal panel so that a predetermined-colored screen is displayed on the liquid crystal panel.

During a driving mode of the liquid crystal panel, the one-color film 800 becomes transparent, whereby the light emitted from the backlight unit 900 passes through the transparent one-color film 800, thereby displaying the image based on the video data on the liquid crystal panel.

Accordingly, the LCD device according to the present invention is formed in such a way that the liquid crystal panel is capable of being displayed in any other color instead of the black color through the use of one-color film during the non-driving mode.

Owing to the one-color film 800 for selectively reflecting the light with the same color as that of the external case 600, the liquid crystal panel can be displayed in the same color as that of the external case 600 during the non-driving mode. Thus, the LCD device with the external case 600 according to the present invention can be recognized as the single color during the non-driving mode.

According as the LCD device according to the present invention is formed in such a way that the liquid crystal panel is displayed in the same color as that of the external case 600 during the non-driving mode, esthetic needs can be satisfied by providing the colorful LCD device, to thereby fulfill the consumer's preference for the terminal with the LCD device according to the present invention.

In the LCD device according to the present invention, the one-color film 800 for selectively reflecting the light with the predetermined wavelength becomes transparent so that it is possible to prevent quality of picture displayed on the liquid crystal panel from being deteriorated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD (liquid crystal display) device comprising:
 a backlight unit for supplying light to a liquid crystal panel including lower and upper substrates;
 a first polarizing plate formed between the lower substrate and the backlight unit;
 a second polarizing plate formed on the upper substrate;
 a passivation substrate for protecting the lower and upper substrates;
 a one-color film for selectively reflecting light with a predetermined wavelength during a non-driving mode of the backlight unit;
 an air gap formed between the one-color film and the second polarizing plate or between the one-color film and the passivation substrate; and
 an external case for covering the liquid crystal panel;
 wherein the one-color film comprises an adhesive layer, a cholesteric liquid crystal layer and a single quarter wave plate, wherein the quarter wave plate is only formed under the cholesteric liquid crystal layer and the quarter wave plate is not formed over the cholesteric liquid crystal layer and the adhesive layer is interposed between the cholesteric liquid crystal layer and the quarter wave plate,
 wherein the one-color film selectively reflects light having the same color as that of the external case.

2. The LCD device according to claim 1, wherein the passivation substrate is formed of a touch panel or glass substrate.

3. The LCD device according to claim 1, wherein the one-color film further includes an air gap interposed between the cholesteric liquid crystal layer and the quarter wave plate.

4. The LCD device according to claim 1, wherein the one-color film is formed on the passivation substrate, or under the passivation substrate.

5. The LCD device according to claim 1, wherein the one-color film is formed on the second polarizing plate, or under the second polarizing plate.

6. The LCD device according to claim 1, wherein the cholesteric liquid crystal layer is formed on the passivation substrate, or under the passivation substrate.

7. The LCD device according to claim 6, wherein the quarter wave plate is formed on the second polarizing plate, or under the second polarizing plate.

* * * * *